United States Patent [19]

Kim

[11] Patent Number: 5,352,429
[45] Date of Patent: Oct. 4, 1994

[54] DYNAMIC COMPACTION PROCESSING SYSTEM

[75] Inventor: Kibong Kim, Potomac, Md.

[73] Assignee: The United States of America as represented by the Secretary of the Navy, Washington, D.C.

[21] Appl. No.: 914,678

[22] Filed: Jul. 14, 1992

[51] Int. Cl.$^5$ .................... C01B 31/06; C01B 21/064
[52] U.S. Cl. ..................... 423/446; 264/84; 423/290; 423/DIG. 11
[58] Field of Search ....... 423/446, 289, 290, DIG. 11; 148/515; 102/293; 264/3.1, 84

[56] References Cited

U.S. PATENT DOCUMENTS

| | | | |
|---|---|---|---|
| 3,238,019 | 3/1966 | DeCarli | 423/446 |
| 3,499,732 | 3/1970 | Garrett | 264/84 |
| 3,667,911 | 6/1972 | Balchan | 423/446 |
| 4,402,270 | 9/1983 | McCaffrey | 102/275.3 |
| 4,483,836 | 11/1984 | Adadurov et al. | 423/446 |
| 4,699,060 | 10/1987 | Vuillaume et al. | 102/313 |

FOREIGN PATENT DOCUMENTS

| | | | |
|---|---|---|---|
| 2222723 | 9/1990 | Japan | 423/446 |
| 822363 | 10/1959 | United Kingdom | 423/446 |
| 1281002 | 7/1972 | United Kingdom | 264/84 |

OTHER PUBLICATIONS

Pearson, *Journal of Metals*, 1960, pp. 673-681.

Primary Examiner—Michael Lewis
Assistant Examiner—Stephen G. Kalinchak
Attorney, Agent, or Firm—Jacob Shuster

[57] ABSTRACT

Carbonaceous material embedded within an explosive charge, is subjected to pressure and temperature conditions during detonation of the charge at a supervelocity modified to obtain a compaction pressure profile having a peak pressure that is of substantially constant prolonged duration.

3 Claims, 2 Drawing Sheets

DYNAMIC COMPACTION PROCESSING SYSTEM

BACKGROUND OF THE INVENTION

This invention relates generally to compaction of material under high pressure and temperature conditions produced within an explosive charge.

The positioning of carbonaceous material such as graphite within an explosive charge that is detonated to produce the high pressure and temperature conditions deemed necessary to compact the graphite into diamonds, is generally known in the art as disclosed for example in U.S. Pat. No. 3,238,019 to De Carli. Modification of the detonation phenomenon in explosive charges by formation of cavities therein through which detonation induced shock waves are propagated, is also well known in the art. Pulse pressure conditions associated with the detonation of explosive charges has been varied by such modification (referred to as a "channel effect"), primarily to increase the detonation velocity otherwise dependent only on the density and sensitivity of the explosive material. A "channel effect" modification of an explosive charge is disclosed for example in U.S. Pat. No. 4,402,270 to McCaffrey, wherein an otherwise continuous cavity channel is blocked at one or more locations therein to further increase the self-sustaining detonation velocity.

Other "channel effect" types of explosive charge modifications are now available. One of such other "channel effect" modifications includes a multiple cavity arrangement involving continuous channels in combination with blocked channels in a body of explosive material. Another modification involves plural continuous channels in radially spaced relation to a central continuous channel for compounding of the "channel effect" by interaction of shock waves in the respective channels. Still other "channel effect" modifications may be achieved by use of fibers as the explosive material, and by internally lining a continuous channel with a helically threaded formation to obtain periodic partial interruption of shock waves propagated through the channel, without pressure oscillations, in response to a detonation pulse.

It is an important object of the present invention to compact carbonaceous material by detonation of an explosive charge modified to improve the conditions under which compaction products, such as diamonds, are obtained.

SUMMARY OF THE INVENTION

In accordance with the present invention, "channel effect" modification of explosive charge detonation is utilized to alter the variable pressure profile otherwise produced at the location within the explosive charge body of carbonaceous material to be compacted. Such alteration of the pressure profile involves both a reduction in the peak pressure level and prolongation of its duration before rapid decay of the pressure from its peak value. As a result of such prolongation of the peak compaction pressure, to which the carbonaceous material is subjected, undesirable effects in the synthesis of products such as diamonds are avoided.

BRIEF DESCRIPTION OF THE DRAWING FIGURES

Other objects, advantages and novel features of the invention will become apparent from the following detailed description of the invention when considered in conjunction with the accompanying drawings wherein.

DETAILED DESCRIPTION OF PREFERRED EMBODIMENT

Figure 1:
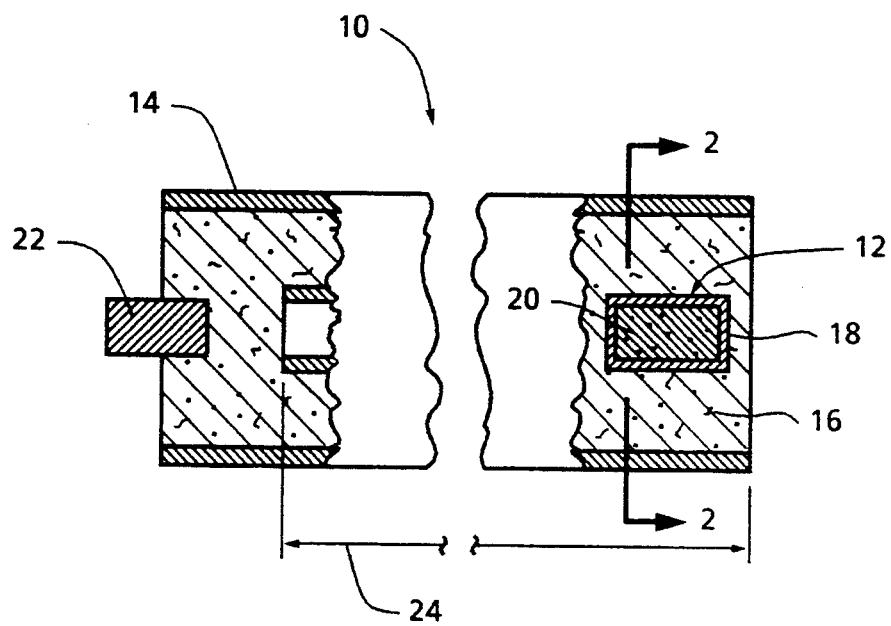
FIG. 1 is a partial side section view of an explosive charge within which a packet of carbonaceous material is embedded, in accordance with one embodiment of the invention.
Figure 2:
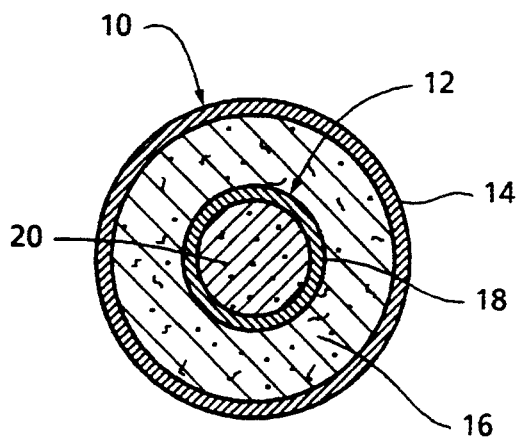
FIG. 2 is a transverse section view taken substantially through a plane indicated by section line 2—2 in FIG. 1.

Referring now to the drawing in detail, FIGS. 1 and 2 illustrate by way of example an explosive charge generally referred to by reference numeral 10 within which a packet 12 of carbonaceous material is embedded. The charge 10 comprises a tubular housing 14 enclosing a body of explosive material 16 in contact with and in surrounding relation to the packet 12. The packet includes an outer a container 18 within which carbonaceous material 20, such as graphite particles, is retained.

A detonator 22 is inserted into one end 23 of charge 10 for detonating the body of the explosive material 16 within the tubular housing 14. The entire assembly shown in FIGS. 1 and 2 may be located in a suitable surrounding to afford recovery of a compaction product into which the packet 12 is transformed.

When the charge 10 is ignited through detonator 22 to initiate a compaction process, a pressure pulse is propagated through the body of explosive material 16 at a self-sustaining detonation velocity to establish the compaction pressure and temperature conditions at the location of packet 12. For successful synthesis of the compaction product from the graphite or other carbonaceous material 20 in packet 12, the parameters of the compaction conditions, including pressure and temperature as well as the duration of peak pressure must be in a range to permit formation of such product as stated for example in the aforementioned U.S. Pat. No. 3,238,019 to De Carli. In accordance with the present invention, the duration of the peak pressure is prolonged in order to improve compaction conditions. Toward that end, an appropriate cavity arrangement is formed within an axially extending zone 24 in the charge 10 between the detonator 22 at axial end 23 and the opposite end of axial 25 the charge 10. According to the embodiment of in FIG. 1, the packet 12 is shown more closely spaced from end 25 than end 23. The zone 24 is axially spaced from end 23 within the charge 10 as also shown in FIG. 1. The cavity arrangement is selected from the available modified "channel effect" types as aforementioned.

Figure 3:
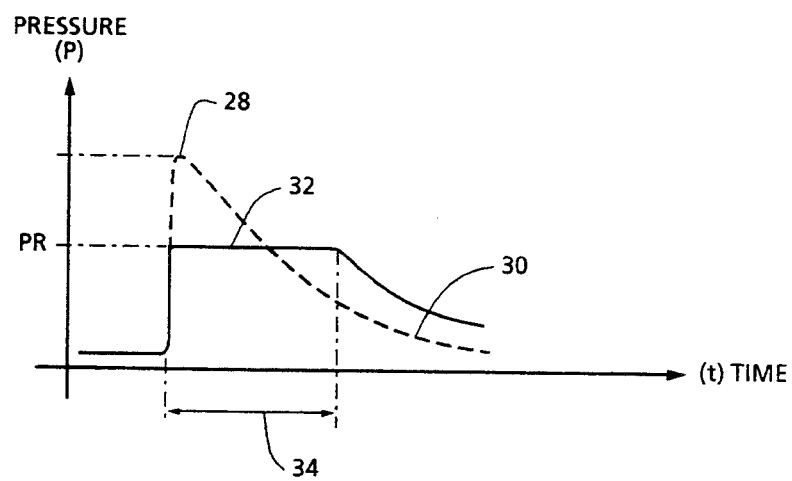
FIG. 3 is a graphical illustration of the pressure profile associated with the process initiated in the explosive charge shown in FIGS. 1 and 2.

As graphically shown in FIG. 3, a variable compaction pressure having a profile reflected by curve 26, is established at the location of packet 12 within the body of explosive material 16 in response to detonation thereof. Ordinarily, under normal detonation conditions without channel effects, the pulse pressure has a peak value 28 as shown in FIG. 3 on the dotted line portion of a pressure profile curve 30. Such pressure profile is characterized by rapid decay of the compaction pressure from peak portion 28 of curve 30. In accordance with the present invention however, supervelocity detonation is altered by selection of the modified "channel effect" cavity arrangement in zone 24 operative to reduce the peak value of the compaction pressure to a constant level $P_R$ along curve portion 32 having a prolonged duration 34 before decay reflected by the a flat top pressure profile curve 26 shown by solid line in FIG. 3 is created. The available techniques as aforementioned are utilized to modify the "channel effect" through the cavity arrangement in zone 24 of charge 10 producing the desired flat top pressure profile in accordance with the present invention.

Figure 4:
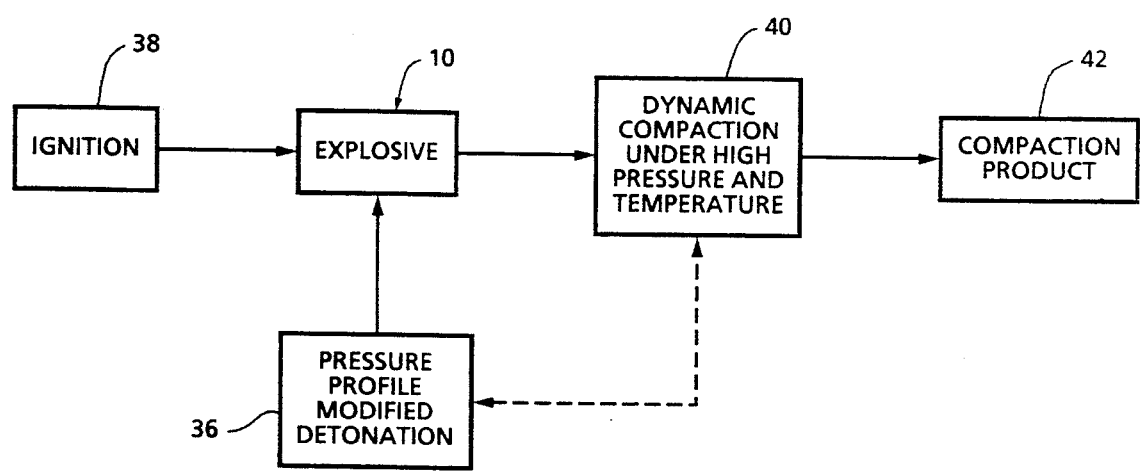
FIG. 4 is a schematic block diagram of the process associated with FIGS. 1, 2 and 3.

The process of the present invention may be summarized by reference to FIG. 4, wherein the explosive 10 is provided with the modified "channel effect" cavity arrangement in zone 24 in order to obtain the flat top pressure profile type of modified detonation 36 in response to the process initiating ignition step 38. As a result of such detonation, the packet 12 undergoes dynamic compaction as indicated at 40 to produce the compaction product 42, such as a diamond according to one embodiment of the invention.

Numerous other modifications and variations of the present invention are possible in light of the foregoing teachings. It is therefore to be understood that within the scope of the appended claims the invention may be practiced otherwise than as specifically described.

What is claimed is:

1. In a method of compacting material encased within a container, including placement of the container in contact with an explosive exert on the material a variable compaction pressure having a peak value of short duration in response to detonation of the explosive without channel effects, the improvement comprising the steps of: preparing said explosive to establish channel effects therein affecting the compaction pressure; and initiating said detonation of the explosive while in contact with the container of the material for propagation of shock waves through said explosive at a velocity increased by the channel effects therein so that the peak value of the variable compaction pressure is reduced to a lower level by the channel effects and maintained constant at said lower level for an interval longer than said detonation without channel effects.

2. The method of claim 1 wherein said material within the container is graphite.

3. In a method of compacting carbonaceous material within a container by detonation of an explosive exerting a variable compaction pressure which undergoes rapid decay from a peak value in the absence of channel effects; the steps of: positioning the container with the material therein prior to said detonation at a location in contact with the explosive; and modifying said detonation by preparing the explosive prior to said detonation so that it includes channel cavities through which shock waves produced by said detonation are propagated to limit the variable compaction pressure to a level that is lower than the peak value provided without said channel effects and maintained constant thereat for a duration prolonged to delay the decay of said variable compaction pressure.

* * * * *